(12) United States Patent
White et al.

(10) Patent No.: US 8,180,677 B2
(45) Date of Patent: May 15, 2012

(54) SYSTEM AND METHOD FOR COMPENSATING USERS FOR ADVERTISING DATA IN A COMMUNITY OF END USERS

(75) Inventors: Scott White, Austin, TX (US); Ian C. Schmehi, San Antonio, TX (US); Thomas R. Sauer, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1040 days.

(21) Appl. No.: 12/045,925

(22) Filed: Mar. 11, 2008

(65) Prior Publication Data
US 2009/0235307 A1 Sep. 17, 2009

(51) Int. Cl.
*G06Q 30/00* (2006.01)
*G05B 19/418* (2006.01)
(52) U.S. Cl. .................. 705/14.73; 370/229; 370/230.1; 370/235
(58) Field of Classification Search .................. 370/229, 370/230.1, 235
See application file for complete search history.

(56) References Cited

U.S. PATENT DOCUMENTS

| | | | |
|---|---|---|---|
| 7,076,072 | B2 | 7/2006 | Feng |
| 7,133,837 | B1 | 11/2006 | Barnes, Jr. |
| 7,719,966 | B2 * | 5/2010 | Luft et al. ..................... 370/229 |
| 2006/0288100 | A1 | 12/2006 | Carson |
| 2007/0130014 | A1 * | 6/2007 | Altberg et al. .................. 705/14 |
| 2007/0198339 | A1 | 8/2007 | Shen |

OTHER PUBLICATIONS

- Press Red Now for Impulse Response Interactive Television Advertising. Oct. 17, 2007.M2 Presswire.*

* cited by examiner

*Primary Examiner* — John Weiss
*Assistant Examiner* — Victoria Vanderhorst
(74) *Attorney, Agent, or Firm* — G. Michael Roebuck

(57) ABSTRACT

A computer readable medium is disclosed, containing instructions useful in performing a method for sending advertising data, the method comprising measuring user-to-user connectivity between users within a community of users; determining a plurality of highly connected users (HCUs) based on the user-to-user connectivity; and sending advertising data to selected HCUs based on a zone of influence (ZOI) for each HCU. A system useful in performing the method is disclosed.

24 Claims, 8 Drawing Sheets

SYSTEM AND METHOD FOR COMPENSATING USERS FOR ADVERTISING DATA IN A COMMUNITY OF END USERS

FIELD OF THE DISCLOSURE

The present invention relates to the field of targeted advertising.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements.

Advertisements are a component in digital video services, including live or pre-recorded broadcast television (TV), special or pay-per-view programming, video on demand (VOD), and other content choices available to subscribers.

DETAILED DESCRIPTION

Figure 1:
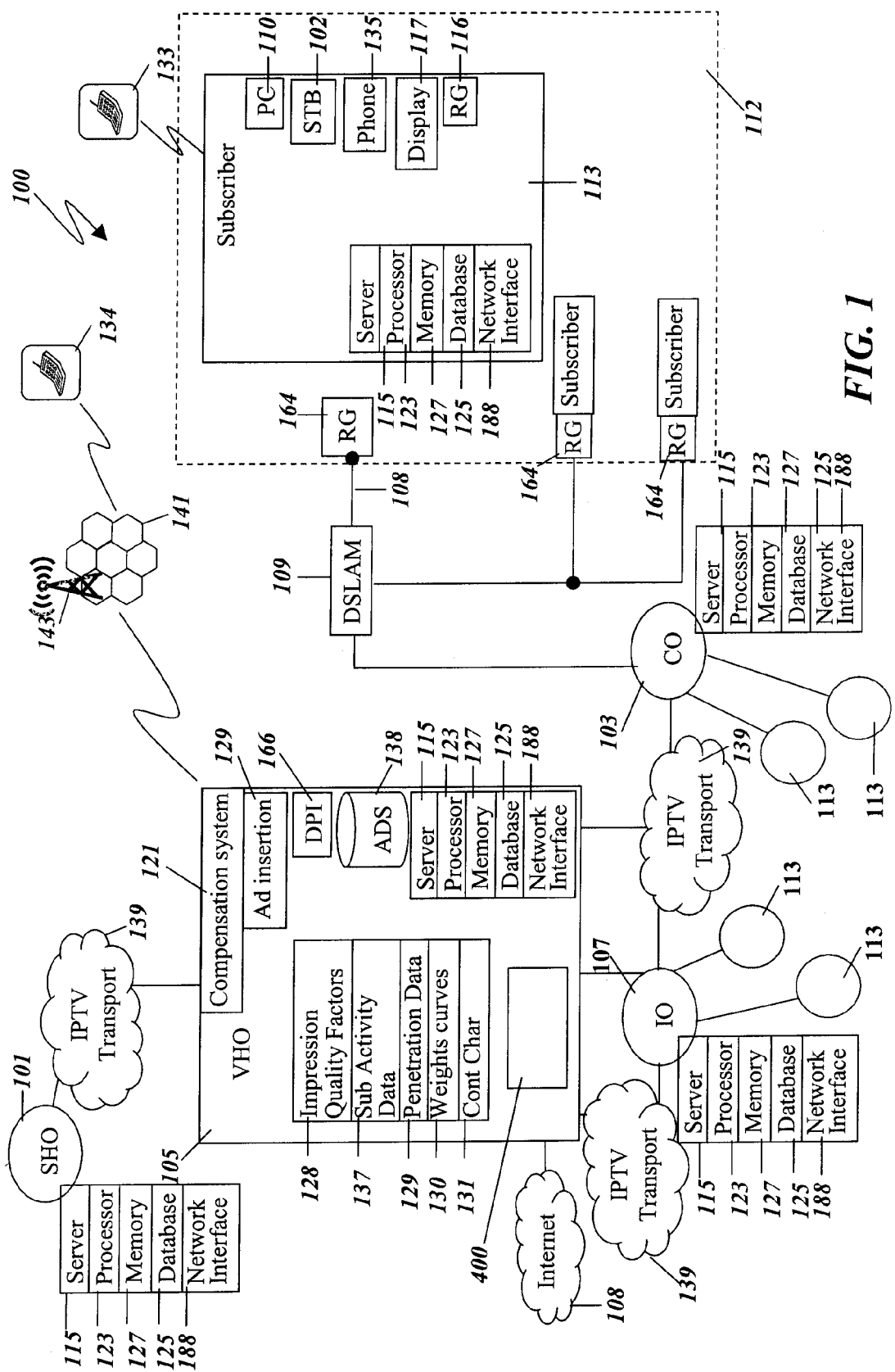
FIG. 1 depicts an illustrative embodiment of a system for sending advertising data and monitoring data sent and received by various subscriber devices associated with a subscriber for to estimate penetration for the advertising data.

In a particular illustrative embodiment, a system and method are disclosed that allow members of an online community or online community resource to invite other potential users to join a community, who in turn invite additional users. The inviting users and those who they in turn invite increase the benefit to the user who initiated the invitation "pyramid" in the first place. Targeted advertisers thereafter promote advertising to the community members, and pay a bounty to the inviting users based on the number of new users their invitation results in. Users on lower tiers of the community (who have invited fewer people) are compensated to a lesser degree than those on higher tiers. Based on the ground rules of the community, the advertising bounty could optionally be paid to the community instead of individual members.

As an example, if a person was a member of a community online with an existing profile for Boaters. That member would be served advertising data that were relevant to their profile and to boaters. With an invitation only, an original user could invite others into this community and those additional users would be served the same profile of advertising data as the "original user". Additionally, the original user would reap a larger revenue share for the advertising data revenue based upon the profile. If there were 5 layers of users in the pyramid (inverted), the original user would see 5× the revenue as the $5^{th}$ layer in the club. The same profile for this community of users would be identical due to the common interest/profile. This invention allows groups and their members to monetize their interests through expanding the member/user base in the community, while allowing advertisers to more effectively target their inventory to a community of users whose profile in a community is known.

In a particular embodiment a computer readable medium is disclosed, containing instructions useful in performing a method for sending advertising data, the method including but not limited to measuring user-to-user connectivity between users within a community of users determining a plurality of highly connected users (HCUs) based on the user-to-user connectivity; and sending advertising data to selected HCUs based on a zone of influence (ZOI) for each HCU. In another embodiment of the medium, in the method the ZOI for each HCU is based a number of contacts with users outside of the community by the HCU. In another embodiment of the medium, in the method the ZOI for each HCU is based a number of contacts with users outside of the community by the HCU. In another embodiment of the medium, the method further includes but is not limited to weighting each HCU based on ZOI number of contacts, affiliation type and geographic distribution of contacts. The affiliation type reflects topics of discussion between the users, such as sports, music, art, fashion, politics, etc.

In another embodiment of the medium, in the method the advertising data is selected based on a correlation between advertising characterization data and the HCU weights. In another embodiment of the medium, the method further includes but is not limited to measuring forwarding of the advertising data from each HCU to end users within each ZOI. In another embodiment of the medium, the method further includes but is not limited to measuring discussion of the advertising data within each ZOI. In another embodiment of the medium, the method further includes but is not limited to calculating penetration of the advertising data based on the advertising data forwarding and advertising data discussion. In another embodiment of the medium, the method further includes but is not limited to determining compensation for each HCU based on the calculated penetration of advertising data for each HCU.

In another embodiment a system is disclosed that is useful in sending advertising data the system including but not limited to a processor in data communication with a computer readable medium; and a computer program embedded in the computer readable medium, the computer program further including but not limited to instructions to measure user-to-user connectivity between users within a community of users, instructions to determine a plurality of highly connected users (HCUs) based on the user-to-user connectivity and instructions to send advertising data to selected HCUs based on a zone of influence (ZOI) for each HCU. In another embodiment of the system, in the computer program the ZOI for each HCU is based a number of contacts with users outside of the community by the HCU. In another embodiment of the system in the computer program further includes but not limited to instructions to assign weights to each HCU based on ZOI number of contacts, affiliation type and geographic distribution of contacts.

In another embodiment of the system in the computer program, the advertising data is selected based on a correlation between advertising characterization data and the HCU weights. In another embodiment of the system in the computer program further includes but not limited to instructions to measure forwarding of the advertising data from each HCU to end users within each ZOI. In another embodiment of the system in the computer program further includes but is not limited to instructions to measure discussion of the advertising data within each ZOI. In another embodiment of the system the computer program further includes but not limited to instructions to calculate penetration of the advertising data based on the forwarding of the advertising data and discussion of the advertising data. In another embodiment of the system in the computer program the computer program further includes but not limited to instructions to determine compensation for each HCU based on the calculated penetration of advertising data for each HCU.

In another embodiment, a computer readable medium is disclosed containing a data structure for containing data useful in sending advertising data, the data structure including but not limited to a first field for containing data indicative of members of a community of end users in a data communication system; and a second field for containing data indicative of a plurality of HCUs in the community, wherein the HCUs are end users who communicate above a certain number of times per time period with other end users in the community.

In another embodiment of the medium the data structure further includes but is not limited to a third field for containing data indicative of a zone of influence (ZOI) for each of the HCUs. In another embodiment of the medium the data structure further includes but is not limited to a fourth field for containing data indicative to characterization data for each ZOI. In another embodiment of the medium the data structure further includes but is not limited a fifth field for containing data indicative of advertising penetration data based on advertising forwarding data and advertising discussion data.

In a particular illustrative embodiment, a system and method are disclosed for providing penetration effectively (PE) indices for advertisements, indicating not only on how many devices upon which the advertising data were viewed and for how long/which portions were viewed, but also by which audiences and the effect the advertising data had on the recipient audiences. Accurate advertising ratings can be made available based on correlating program and advertising insertion data stored on video services servers (or embedded in content from video service providers) with subscriber activity logs which track customers' viewing behavior in some detail. Demographic data on customers also can be correlated with advertising ratings at the aggregate level.

In another particular embodiment, a computer readable medium is disclosed containing a computer program that when executed by a processor performs a method for estimating PE for targeted advertising data in a community of user on a communication network, the computer program including but not limited to instructions to correlate impression quality factors categories data with a subscriber activity data profile for purchases and consumption related to an advertising category for the targeted advertising data; and instructions to estimate from the correlation the effectivity index in the advertising category for the targeted advertising data. In another particular embodiment of the medium the instructions to estimate the PE further comprise instructions to add a reciprocal for a quality of impression for the advertising data to a strength of response for the advertising data, wherein the strength of response indicates a degree of impact on the subscriber in an advertising category for the advertising data.

In another particular embodiment of the medium the impression quality factors categories data comprise combinations of impression quality factors data from at least two factors selected from the group consisting of subscriber device state data indicative of a degree of active advertising data viewing, subscriber device type data indicative of a type of subscriber device receiving the advertising data, content character data indicative of a content character and subscriber type data indicative of a type of subscriber viewing the advertising data.

In another particular embodiment of the medium the impression quality categories data are formed by sorting impression quality factors data into the impression quality factors categories data, applying weights to the sorted impression quality factors categories data, and accumulating the weighted impression quality factors categories data into the impression quality factors categories data. In another particular embodiment of the medium the subscriber device type is selected from the group consisting of a personal computer, a mobile telephone, a television monitor, personal data assistant and web tablet. In another particular embodiment, of the method the subscriber type is selected from the group consisting of gender, age, income, geographic location, race and language. In another particular embodiment of the medium the subscriber device state is selected from the group consisting of speaker volume, display on duration, display off duration and multiple device usage, end user device preference, and current device.

In another particular embodiment, a system is disclosed for estimating PE for targeted advertising data in a community of users in a communication network, the system including but not limited to a processor in data communication with a computer readable medium; and a computer program embedded in the computer readable medium useful for performing a method for estimating PE for targeted advertising data in a communication network, the computer program comprising instructions for correlating impression quality factors categories data with a subscriber activity data profile for purchases and consumption related to an advertising category for the targeted advertising data and estimating from the correlation the PE in the advertising category for the targeted advertising data.

In another particular embodiment of the system, the computer program for estimating the PE further includes but is not limited to instructions to add a reciprocal for a quality of impression for the advertising data to a strength of response for the advertising data, wherein the strength of response indicates a degree of impact on the subscriber in an advertising category for the advertising data. In another particular embodiment of the system, the computer program further includes but is not limited to instructions for the estimating the strength of response by a difference between subscriber purchases in the advertising category before an impression for the advertising data and after the impression for the advertising data.

In another particular embodiment of the system the computer program further includes but is not limited to instructions to estimate the strength of response further include but are not limited to instructions for dividing the difference by a tendency in the advertising category, wherein the tendency is estimated as the sum of searches by the subscriber in the advertising category multiplied by a weighting factor M plus purchases by the subscriber in the advertising category multiplied by a weighting factor N. In another particular embodiment of the system the impression quality factors categories data comprise combinations of impression quality factors data from at least two factors selected from the group consisting of subscriber device state data indicative of a degree of active advertising data viewing, subscriber device type data indicative of a type of subscriber device receiving the advertising data, content character data indicative of a content character and subscriber type data indicative of a type of subscriber viewing the advertising data.

In another particular embodiment of the system the impression quality categories data are formed by sorting impression quality factors data into the impression quality factors categories data, applying weights to the sorted impression quality factors categories data, and accumulating the weighted impression quality factors categories data into the impression quality factors categories data. In another particular embodiment of the system the subscriber device type is selected from the group consisting of a personal computer, a mobile telephone, a television monitor, personal data assistant and web tablet. In another particular embodiment of the system the subscriber type is selected from the group consisting of gender, age, income, geographic location, race and language.

In another particular embodiment of the system, the subscriber device state is selected from the group consisting of speaker volume, display on duration, display off duration and multiple device usage, end user device preference, and current device. In another particular embodiment of the system the content character is selected from the group consisting of first run, rerun, special event, series episode and finale.

In another particular embodiment a data structure embedded in a computer readable medium is disclosed, the data structure comprising a first field for storing data indicative of an effectivity index for targeted advertising data in an advertising category based on a correlation between impression quality factors data and subscriber activity data. In another particular embodiment, the data structure further includes but is not limited to a second field for storing data indicative of a quality of impression, Q wherein Q is based on the impression quality factors data. In another particular embodiment of the data structure further includes but is not limited to a third field for storing data indicative of a strength of response (SOR) for containing data indicative of the SOR based on a difference between present consumption and past consumption in an advertising category for the advertising data divided by a sum of searches by the subscriber in the advertising category multiplied by a weighting factor M plus a consumption by the subscriber in the advertising category multiplied by a weighting factor N.

In another particular embodiment, a computer readable medium is disclosed containing computer program instructions that when executed by a computer perform a method for estimating an effectivity index for targeted advertising data in a communication network, the computer program comprising instructions to correlate impression quality factors categories data with a subscriber activity data profile for purchases and consumption related to an advertising category for the targeted advertising data; and instructions to estimate from the correlation the effectivity index in the advertising category for the targeted advertising data. In another particular embodiment, a client device is disclosed comprising a memory containing a computer program, the computer program further comprising instructions to collect impression quality factors categories data comprising combinations of impression quality factors data from at least two factors selected from the group consisting of subscriber device state data indicative of a degree of active advertising data viewing, subscriber device type data indicative of a type of subscriber device receiving the advertising data, content character data indicative of a content character and subscriber type data indicative of a type of subscriber viewing the advertising data.

In another particular embodiment, a system and method distinguish between real-time versus time-shifted viewing: Consumers who off-shift their viewing by using mechanisms such as DVR and TiVo™ may be motivated to do this partially by the opportunity it affords to fast-forward over advertisements during replay. In addition, some pre-recorded broadcasts containing embedded advertising data are never viewed (estimates range as high as one-third); or may be viewed so much later that advertisements have lost their value due to stale or expired offers that are no longer relevant. Another illustrative embodiment provides for tracking viewer ship on increasingly numerous alternative viewing devices, such as mobile MP3/video players, cell phones, and other personal mobile devices, as well as traditional in-home television sets.

In another particular embodiment, a system and method estimate an "engagement" or depth of experience—how "active" is "active viewing/listening." This is gauged by external indicators such as whether the sound during an advertisement on a subscriber device was tuned low, only the first few or last few seconds of a 30-second advertising spot were viewed, by which viewers in particular, and so on.

Another illustrative embodiment provides for monitoring of advertisement viewing by demographically-differentiated audiences. Monitoring can be performed for advertisements viewed during normal real-time broadcasting, for both national and local channels; advertisements viewed when replayed from any pre-recorded broadcasts; and advertisements included as headers or trailers in video-on-demand playouts or spliced into streaming media. Exactly which part(s) of the advertisements were viewed for how long is available with per-second or higher accuracy. Demographic differentiators can include but are not limited to viewership by community location and income level brackets, as well as estimates of the number of viewers by age, educational, professional, race, and gender categories, qualified by probability.

Another embodiment correlates records which indicate when and for how long advertisements occur in any media available for consumption by subscribers, with records which indicate exactly what the state of subscribers' devices is during such designated intervals while the media is being consumed. For example, suppose a 30-second advertisement occurs one minute after the broadcast of a TV series episode starts; the subscriber has programmed a set top box (STB) to record the given episode; and the subscriber plays back the pre-recorded show the next day. Both the pre-recording and the playback can be dependent on a communication system provider, such as an Internet protocol television (IPTV) system, which through internal processing, are captured by IPTV logging. Substantially all media assets referred to herein as content available to subscribers are inventoried with advertisements, either as provided by the supplying vendor in metadata when uploaded, or as spliced in during broadcast at national or local acquisition servers or at the receiving subscriber device.

During playback on a subscriber device, records indicating subscriber behavior, including whether or not and for how long audio on a subscriber device has been muted and/or fast forward or other controls have been hit, are collected and stored in a subscriber activity data profile and impression quality factors data. Therefore, correlating the time during which the advertisement plays back with subscriber behavior indicates whether the advertisement was rendered to the screen and/or speakers, which portions, and for how long to per-second or greater accuracy.

Another illustrative embodiment provides subscriber activity data profile records and impression quality factors data. That is, these subscriber activity data profile can identify when and for how long advertisements occur within available media, to identify subscriber behavior about media content consumption. Another particular embodiment monitors substantially all subscribers and substantially all subscriber devices and generates events and records of subscriber activity and impression quality factors data on a per-device and per-subscriber basis. There is substantially no limitation to any specific type of STB, or even to STB devices; substantially all consumer devices, such as cell phones or personal data assistant (PDA's) capable of consuming IPTV triple-play or bundled services (IPTV, voice over internet protocol (VoIP) and Internet), are eligible for monitoring. In another particular embodiment, note that the mechanism introduces no distinctions between content such as national or local broadcast stations, streaming video or real-time broadcasting, or even between audio, video, and internet consumption; in that records distinguish advertisements from non-advertisements by temporal indicators at sub-second granularity.

In another particular embodiment, advertising data contain digital audio or video markers that are sensed during play back on a subscriber device that indicate advertising playback on a subscriber device at 100%, 75%, 50% and 25% duration. In particular, viewership of much more than "traditional" advertisements can be tracked using digital audio or video markers or temporal indicators or by correlating impression quality factors data with timing of advertising data presentation on a subscriber device. For example, VOD headers and trailers, or segments which feature "product placement" can be identified by markers or by a time in which the product placement, header or trailer appears in content on a subscriber device.

Internet surfing and interactive gaming are monitored, as well for subscriber activity data and impression quality factors data to estimate advertising data penetration. The IPTV system monitors subscriber data transactions, electronic program guides and metadata which distinguishes advertising data from content. With respect to internet usage, IP-level access records indicate which sites were displayed to the screen and/or played on the speaker. Monitoring can be narrowly targeted with respect to collection intervals, audience, and types of devices, as well as restricted to defined levels of aggregation. With respect to gaming or interactive media consumption, vendor-specific agreements can provide appropriate metadata and/or algorithms to estimate temporal markers for advertisements.

Another particular embodiment provides opportunities for correlation of advertisement viewership with patterns of consumer behavior. For example, tracking viewership of an advertised media event and estimating a degree of correlation that exists between having viewed its advertisement(s) and tuning into, and/or pre-recording, the event. Another embodiment estimates how a degree of correlation differs depending on whether the advertising data is presented in an episode in a "regular" series, a "special" episode in a regular series, special event (Super Bowl, etc.) or a pay-per-view show. Another embodiment correlates consumers activating a new IPTV-capable device on their home network with having viewed advertisement(s) for the device.

Another embodiment tracks how many and which subscriber devices are in use referred to as (multiple device usage), including patterns for when and how each subscriber device is utilized over time, or when and how the subscriber devices may be used simultaneously or separately. At this level of granularity, estimates about how many viewers and the quality of the viewing that occurred for specific advertisements, and the demographics of each viewer, are derived and qualified by degree of probability. For example, during installation or troubleshooting, technicians may have recorded the exact placement of subscriber devices in the home, in relation to which household members were likely to use each subscriber device, as well as some personal characteristics of household members.

In particular, any available subscriber-specific information regarding device placement and IPTV VoIP and Internet consumption habits can be leveraged, as long as the final results of such calculations are limited to aggregate quantities not trackable to specific customers. Another embodiment provides for demographically rich data mining of advertisement viewing correlated with consumer media and product consumption behavior in a subscriber activity data profile and impression quality factors data.

Another embodiment records and provides details of which parts of advertisements were rendered to the screen and/or played in audio down to per-second granularity. Due to the availability of per-subscriber records independently maintained in the IPTV triple play system for purposes of billing and customer care, correlation of customer behavior with demographic factors are calculated, within well-defined categories or qualified degrees of probability, at aggregate levels, while maintaining proper safeguards for privacy concerns of customers.

A subscriber impression quality factors data profile can be built by correlating such subscriber related statistics and the subscriber activity data profile along with other subscriber data and information such as gender, age, income, languages spoken, areas of interest, etc. volunteered by a subscriber during an IPTV registration process. In another particular embodiment the subscriber activity data profile information contains data for which a subscriber has opted in for monitoring and use by an IPTV triple play system (providing IPTV, VoIP and Internet) for the purposes of receiving targeted advertising data. Impression quality factors data can be estimated from data included in the impression quality factors data, including but not limited to device type, subscriber type, and device state based on the subscriber activity data profile.

Based on subscribers' interests, background, and subscriber profiling results, one of the following targeted advertising data delivery described herein or an equivalent thereof can be utilized to estimate PE for targeted advertising data provided to personalized advertising data and television commercial delivery to IPTV television displays, portable subscriber data and messaging devices such as mobile or cell phones and website banners and pop up displays on a PC or Laptop.

Turning now to FIG. 1, the IPTV system 100 delivers content and targeted advertising to subscriber house holds 113 and associated end user devices (referred to herein as subscriber devices) which may be inside or outside of the household. Television advertising data is inserted context by the advertising server 138. In the IPTV system, IPTV channels are first broadcast in an internet protocol (IP) from a server at a super hub office (SHO) 101 to a regional or local IPTV video hub office (VHO) server 103, to an intermediate office (IO) server 107 and to a central office (CO) 103. The IPTV system 100 includes a hierarchically arranged network of servers wherein a particular embodiment the SHO transmits video and advertising data to a video hub office (VHO) 103 and the VHO transmits to an end server location close to a subscriber, such as a CO server 103 or IO 107. In another particular embodiment, each of the SHO, VHO, CO and IO are interconnected with an IPTV transport 139. The IPTV transport 139 may consist of high speed fiber optic cables interconnected with routers for transmission of internet protocol data. The IPTV servers also provide data communication for Internet and VoIP services to subscribers.

Actively viewed IPTV channels are sent in an Internet protocol (IP) data multicast group to access nodes such as digital subscriber line access multiplexer (DSLAM) 109. A multicast for a particular IPTV channel is joined by the set-top boxes (STBs) at IPTV subscriber homes from the DSLAM. Each SHO, VHO, CO, IO and STB includes a server 115, processor 123, a memory 127, network interface 188 and a database 125. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed.

In another particular embodiment, subscriber devices, also referred to herein as users and as end user devices, are different stationary and mobile devices, including but not limited to, wire line phones 135, portable phones 133, lap top computers 118, personal computers (PC) 110 and STBs 102, 119 communicate with the communication system, i.e., IPTV system through residential gateway (RG) 164 and high speed communication lines such as IPTV transport 139. In another particular embodiment, DPI devices 124, 126 inspect data VoIP, Internet data and IPTV video, commands and Meta data (multicast and unicast) between the subscriber devices and the IPTV system severs. In a particular embodiment advertising data forwarding and discussion of advertising data and user-to-user connectivity are detected by the DPI devices that monitor at data sent between end users. End user source and destination identifier data in data sent between end users are used to track user-to-user connectivity. Image, text and sound recognition functions are used to detect advertising data discussion and forwarding in addition to the DPI devices. Textual and aural key words and imagery found in the advertising data and messages sent and received by end user devices are inspected by the DPI devices 166 and image recognition functions in the processors 123 in the communication system servers and end user devices are used as indicators found in messages sent between users to estimate penetration of advertising data from discussion and forwarding of the advertising data between users, also referred to herein as end user devices. Impression quality factions for end user identified in penetration data are used to estimate PE.

In another illustrative embodiment impression quality factors data are monitored and collected whether or not the subscriber's devices are in the household 113 or mobile outside of the household such as cellular phones 134. When outside of the household, subscriber mobile device data is monitored by communication network (e.g. IPTV) servers and DPI devices which associate the impression quality factors data with particular subscribers. In another particular embodiment, impression quality factors data including subscriber activity data such as communication transactions are inspected by DPI devices located in a communication system, e.g., IPTV system servers. These communication system servers route the impression quality factors data to a VHO or CO in which the impression quality factors data for a subscriber are stored for processing.

In another particular embodiment, the end user devices or subscriber devices ("users") include but are not limited to a client user computer, a personal computer (PC) 110, a tablet PC, a set-top box (STB) 102, a Personal Digital Assistant (PDA), a cellular telephone 134, a mobile device 134, a palmtop computer 134, a laptop computer 110, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP data, Internet data and IPTV video, commands and Meta data between the subscriber devices and between subscriber devices and the IPTV system severs.

In another illustrative embodiment impression quality factors data are monitored and collected whether or not the subscriber devices are in the household 113 or the devices are mobile devices 134 outside of the household. When outside of the household, subscriber mobile device data is monitored by communication system (e.g. IPTV) servers which associate the impression quality factors data with each particular subscriber's device. In another particular embodiment, impression quality factors data including subscriber activity data such as communication transactions are inspected by DPI devices located in a communication system, e.g., IPTV system servers. These communication system servers route the impression quality factors data to a VHO in which the impression quality factors data for a subscriber are stored for processing in determining advertising data penetration and compensation for HCUs based on their contribution to the penetration.

As shown in FIG. 1 advertising sub groups 112 (comprising a group of subscriber house holds 113) receive multicast advertising data in video data stream from IO server 107 via CO 103 and DSLAM 109 at STB 102. Individual households 113 receive advertising data at set top box 102 or one of the other subscriber devices. More than one STB (see STB1 102 and STB2 119) can be located in an individual household 113 and each individual STB can receive a separate multicast or unicast advertising stream on IPTV transport 139 through DSLAM 109. In another particular illustrative embodiment separate and unique advertising data are displayed at each set top box (STB) 102, 119 tailored to target the particular subscriber watching television at that particular STB. Each STB 102,119 has an associated remote control (RC) 116 and video display 117. The subscriber via the RC selects channels for a video data viewing selection (video programs, games, movies, video on demand) and places orders for products and services over the IPTV system 100.

FIG. 1 depicts an illustrative communication system, including but not limited to a television advertising insertion system wherein television advertising data can be inserted at an IPTV (SHO, VHO, CO) server or at the end user client subscriber device, for example, an STB, mobile phone, web browser or personal computer. Advertising data can be inserted into an IPTV video stream via advertising insertion device 129 at the IPTV VHO server 105 or at one of the STBs 102, 109. The IPTV servers include an advertising server 138 and an advertising database 139. The advertising data is selected by advertising selection element 129 from the advertising database 125 based on a holistic subscriber profile and delivered by the VHO advertising server 138 to the IPTV VHO server 115. An SHO 101 distributes data to a regional VHO 103 which distributes data to local COs 105 which distribute data via IO 107 to a digital subscriber access line aggregator multiplexer (DSLAM) access node to subscriber devices such as STBs 102, 119, PC 110 wire line phone 135, mobile phone 133 etc. Advertising data is also selected based on the community profile for users in the community and sent to a mobile phone or computer associated with the subscriber or end user devices in the community. The community subscriber profile is built based on a community of subscriber's IPTV, Internet and VoIP activity. Compensation system 121 determines compensation for HCUs based on advertising data penetration.

Figure 2:
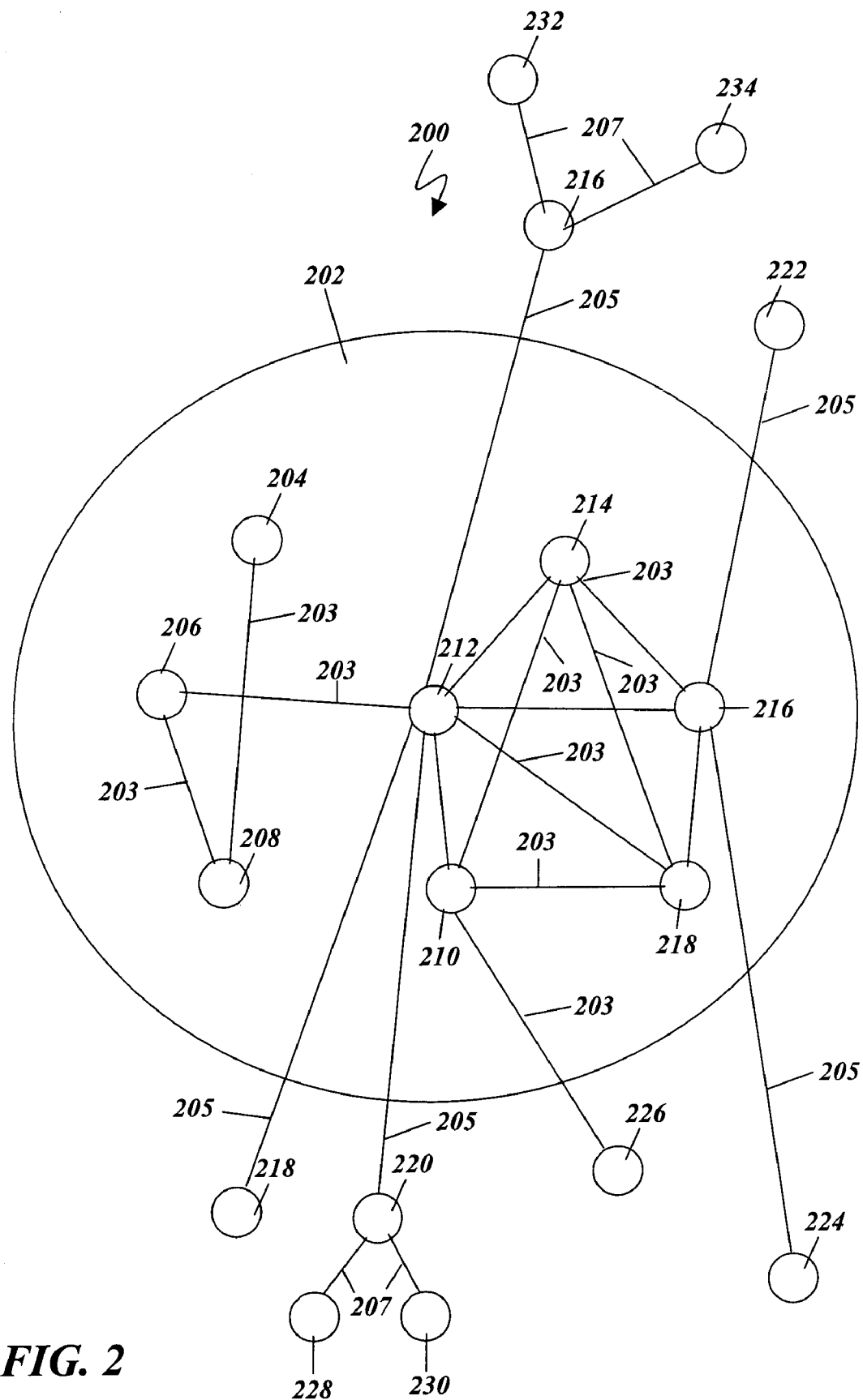
FIG. 2 depicts end user connectivity relationships in an illustrative embodiment.

Turning now to FIG. 2, in an illustrative embodiment a community of users 202 includes a number of subscribers or users (end user devices) 204, 206, 208, 210, 212, 214, 216, and 218. User-to-user connectivity is measured by the number, frequency, duration and data volume of interactions 203 between end users 204, 206, 208, 210, 212, 214, 216, and 218. As shown in FIG. 2, end users 210, 212, 214, 216, and 218 have substantially more user-to-user connectivity than end users 204, 206 and 208. In a particular embodiment, end users 210, 212, 214, 216, and 218 are classified as HCUs. Each HCU has a ZOI defined by connectivity between the HCU and end users outside of the community 202. The ZOI for HCU 212 includes end users 216, 218 and 220. HCU to ZOI connectivity is measured by the number, frequency, duration and data volume of interactions 205 between the HCU and the end users 216, 218 and 220 in the ZOI. HCU 212 connectivity outside of the ZOI is measured by the number, frequency, duration and data volume of interactions 207 between the HCU 212 ZOI end users 216, 218 and 220 and end users 228, 230, 232 and 234. Interactions 203, 205 and 207 are monitored to determine advertising data forwarding, advertising data discussion and advertising data penetration within the ZOI and beyond the ZOI.

Figure 3:
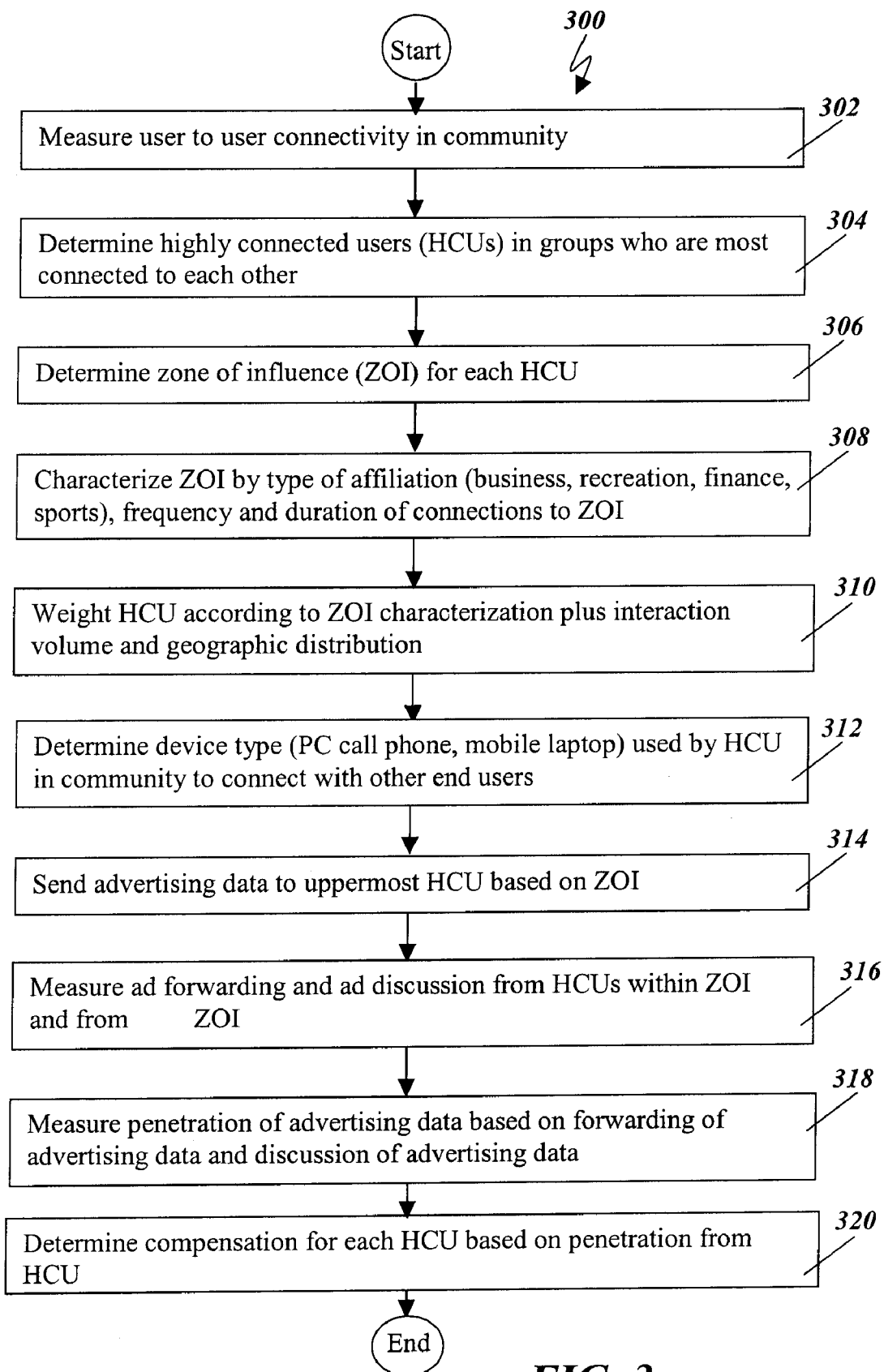
FIG. 3 depicts a flow chart for functions performed in another illustrative embodiment for monitoring data sent and received by various subscriber devices associated with subscribers in a communication system, such as an IPTV system.

Turning now to FIG. 3, in a particular embodiment, a flow chart 300 of functions are performed. The order of execution of functions and the selected functions to be executed is different in different embodiments and is not limited to the order of execution and functions shown is n FIG. 3, in block 302 an illustrative embodiment measures user to user connectivity between end users within the community of users in a communication system. In block 304 an illustrative embodiment determines HCUs as users who are most connected to others end users in the community. In block 306 an illustrative embodiment determines a ZOI for each HCU. In block 308 an illustrative embodiment characterizes each HCU ZOI by type of affiliation (i.e., type of data exchange and discussion type, i.e. sports, news, fusion etc.) between end users in the HCU ZOI. In block 310 an illustrative embodiment assigns weights to each HCU according to the HCU ZOI characterization for the HCU. The HCU ZOI characterization includes but is not limited to type of affiliation, frequency and duration of connections to ZOI and beyond the ZOI.

In block 312 an illustrative embodiment determines a device type for an HCU and end users in the community and ZOI used to connect to each other for advertising data forwarding and advertising data discussion. In block 314 an illustrative embodiment a VHO sends advertising data to an uppermost top tier HCU in the community based on ZOI characterization. In block 316, an illustrative embodiment measures interactions including but not limited to advertising data forwarding and advertising data discussion in each HCU in the community of end users and between the HCU and the end users in the HCU ZOI. In block 318 an illustrative embodiment measures or determines penetration of advertising data from each HCU and the community in which the HCUs reside based on forwarding of advertising data and discussion of advertising data from the HCU to the community and to the end users in the ZOI. In block 320 an illustrative embodiment determines compensation for each HCU based on penetration of the advertising data within each HCU ZOI from each HCU.

Figure 4:
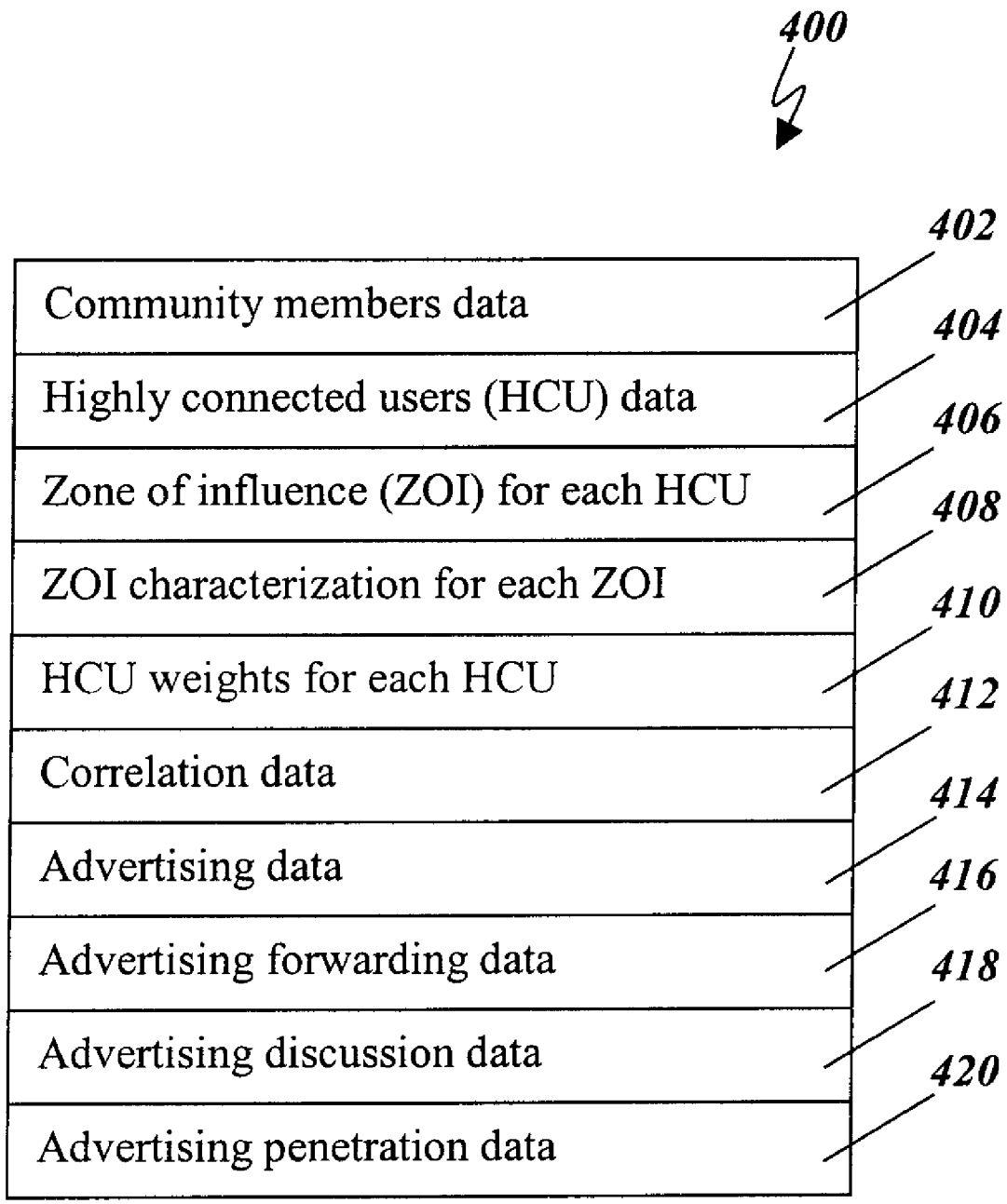
FIG. 4 depicts a data structure embedded in a computer readable medium that is used by a processor and method for delivering advertising data.

Turning now to FIG. 4, in a particular illustrative embodiment a data structure embedded in a computer readable medium is disclosed. The data structure includes but is not limited to a first field 402 for containing data indicative of community member data identifying end users in the community of end users in a communication system. In a particular embodiment, the data structure further includes a second field 404 for containing data indicative of HCUs in the community of end users. In a particular embodiment, the data structure further includes a third field 406 for containing data indicative of a ZOI of end users in an HCU ZOI for each HCU identified in field 404. In a particular embodiment, the data structure further includes a fourth field 408 for containing data indicative of ZOI characterization for each HCU ZOI. In a particular embodiment, the data structure further includes a fifth field 410 for containing data indicative of HCU weights for each HCU. In a particular embodiment, the data structure further includes a sixth field 412 for containing data indicative of containing correlation data indicating a correlation between advertising characterization data and the HCU weights. In a particular embodiment, the data structure further includes a seventh field 414 for containing data indicative of adverting data sent to the HCUs and monitored for forwarding, discussion, penetration and penetration effectiveness.

In a particular embodiment, the data structure further includes an eighth field 416 for containing data indicative of advertising data forwarding from the HCU and from the ZOI. In a particular embodiment, the data structure further includes a ninth field 418 for containing data indicative of advertising discussion between the HCU and members of the community and between the community and the HCU ZOI which started from the HCU. In a particular embodiment, sender identifiers in the data transmissions are used to identify, in an IPTV server or DPI device, the source of a forwarded advertising data and discussion message. In a particular embodiment, the data structure further includes a tenth field 420 for containing data indicative of advertising penetration data for the identified advertising data 414.

Figure 5:
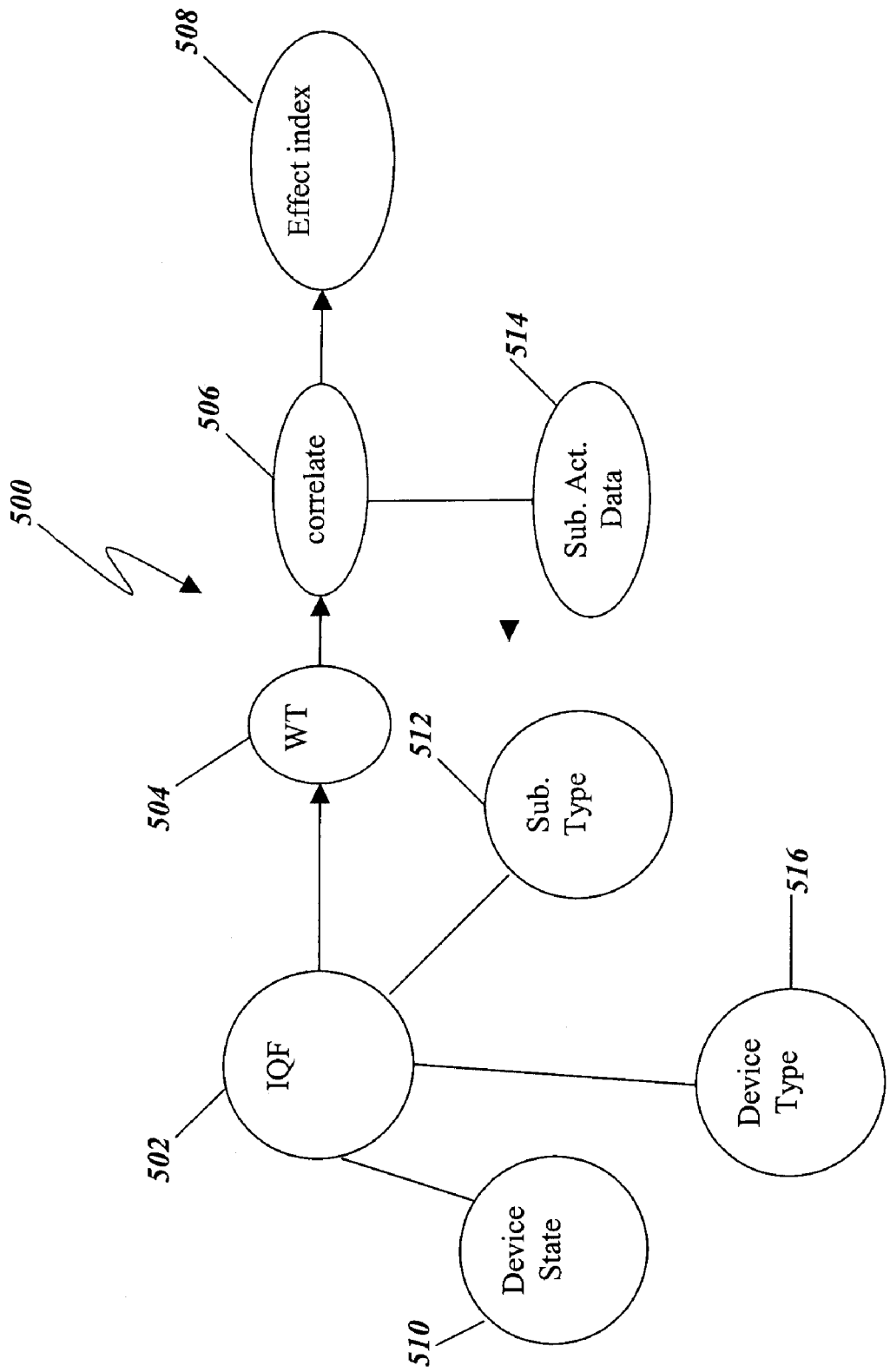
FIG. 5 depicts a data flow diagram for functions performed in another illustrative embodiment for monitoring data sent and received by various subscriber devices associated with subscribers in a communication system, such as an IPTV system.

FIG. 5 depicts a data flow diagram for another illustrative embodiment of a system for sending advertising data and monitoring data sent and received by various subscriber devices associated with subscribers in an IPTV system 100 for monitoring advertising impression quality factors data, advertising data forwarding and advertising data discussion for the subscriber devices. In a particular, illustrative embodiment, the impression quality factors data 502 are accumulated at a subscriber device or through database entries available in the IPTV network subscriber devices report their impression quality factors data to the IPTV system. As shown in FIG. 5 the device state 510, device type 516 and subscriber type 512 are accumulated as impression quality factors data 502. These impression factors quality data, including but not limited to advertising data discussion and advertising data forwarding, are categorized into impression quality factors data categories, and weighted at 504 using weights assigned by the IPTV system for particular impression factor quality data categories. The weighted HCUs, impression quality factors and categories data are correlated with the subscriber activity data

514. The correlation of the weighted, impression quality factors categories data and the subscriber activity data are utilized to estimate the penetration 508 for the advertising data.

Figure 6:
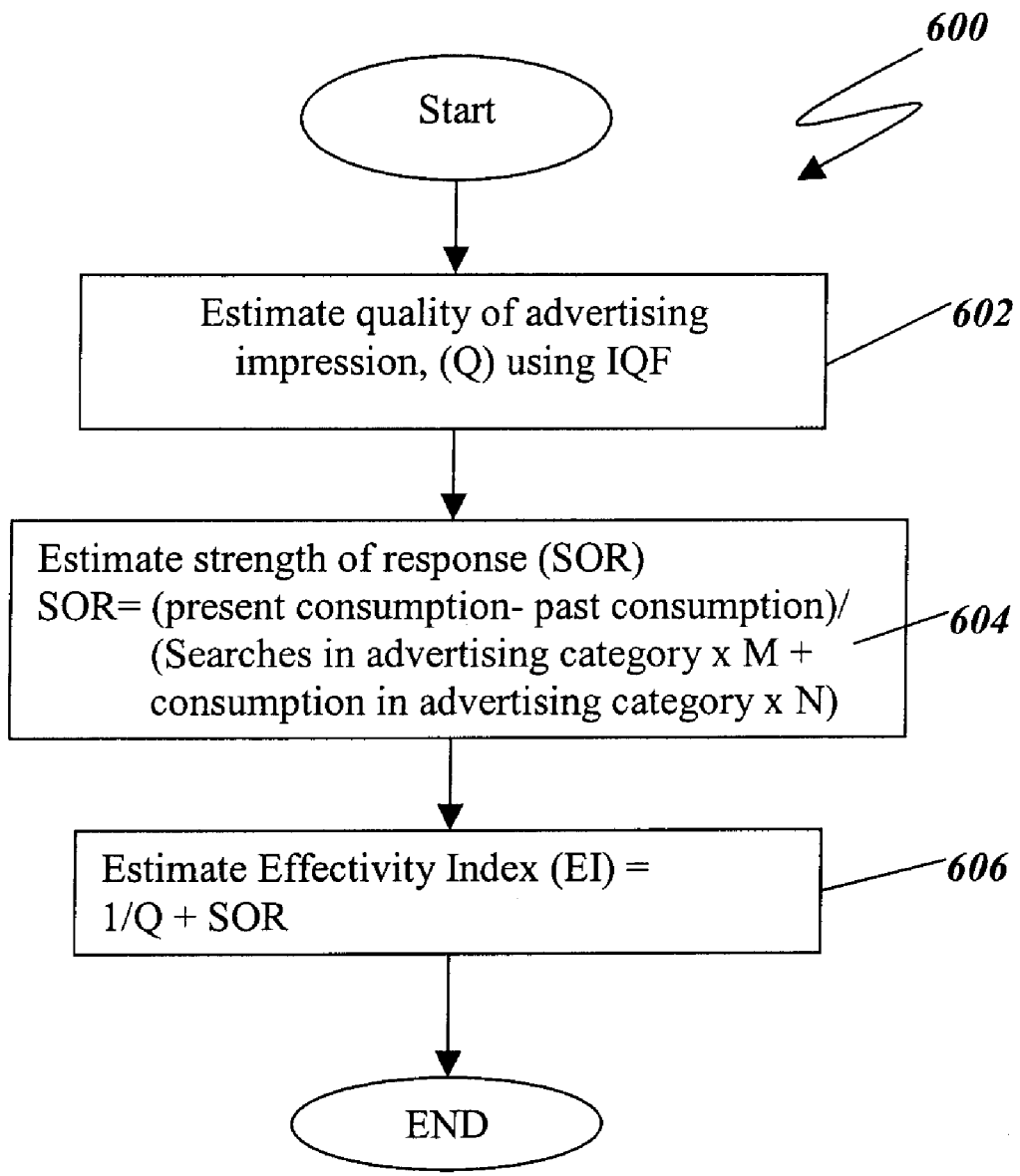
FIG. 6 depicts a flow chart for functions performed in another illustrative embodiment for delivering advertising data monitoring data sent and received by various subscriber devices associated with subscribers in a communication system, such as an IPTV system.

Turning now to FIG. 6, in an illustrative embodiment a function 600 is performed to correlate the impression quality factors category data with the subscriber activity data. The subscriber activity data includes data from a subscriber activity data profile which chronicles purchases and media consumption for a subscriber. Purchases can include but are not limited to purchases over the Internet via eCommerce as well as purchases of media content such as music, movies, books and video on demand. Media consumption can include but is not limited to programs watched, web sites visited, games played, searches performed and music downloaded. Subscriber activity data is collected at the subscriber device and at the IPTV system though monitoring data sent and received to and from the subscriber devices. Subscriber activity data includes but is not limited to data indicating advertising data forwarding, discussion and user-to-user connectivity for a subscriber. As shown at block 602, a particular embodiment estimates the quality of advertising impression, Q using the impression quality factors categories data. The impression quality factors data are sorted into categories and weighted as discussed below.

At block 604 a particular embodiment estimates the strength of response (SOR). The SOR is a measure of the impact or degree of influence that a particular advertising data has on a subscriber in a particular advertising category, based on changes in the subscriber's purchasing and/or consumption after receiving the advertising data directly, forwarded from another user or discussed with another user. The rate of change over time for an SOR in a particular advertising category is a trend for the particular advertising category. The advertising category may be associated with or the same as one of the impression quality factors categories. The subscriber's purchasing and/or consumption trend is estimated from changes in the subscriber's subscriber activity data profile in a particular advertising category. The subscriber activity data profile captures purchases and/or consumption by a subscriber by tracking transactions and selections made on the IPTV triple play network and sorting the transactions into advertising, product and interest categories. These purchases and consumption may include but are not limited to IPTV, VoIP and Internet purchases and consumption. In another embodiment, the SOR equals a quantity for present purchases and/or consumption in a particular advertising category associated with the advertising data, minus a quantity for past purchases and/or consumption in a particular advertising category associated with the advertising data; divided by an indication of the subscribers interest in the advertising category as indicated by a number of searches in the particular advertising data category times a weighting factor, M plus purchases and/or consumption in the particular advertising data category multiplied by waiting factor, N.

The weighting factors M and N are programmable so that searches in a particular advertising category can be weighted more or less than purchases and/or consumption in a particular advertising category. Advertising categories can include but are not limited to sports, fashion, art, literature, action movies, mysteries, food, travel and health. At block 606 a particular embodiment estimates the effectivity index, (EI) as equal to one divided by the estimate of the quality of advertising impression, Q added to the strength of response (SOR). In another particular illustrated embodiment, a subscriber household 113 sends impression quality factors data from an RG or STB in a subscriber household or from a mobile device to an access node such as a DSLAM 109. When sent to the VHO, the identity of the subscriber is associated with the impression quality factors data. The identity of the subscriber can be stripped off of the data as it is aggregated in the IPTV system. The access node 109 sends data to a VHO through a CO.

In another particular illustrative embodiment the service applications are provided by a communication network such as an IPTV system. The service applications include but are not limited to an IPTV system providing IPTV, Internet and VoIP (herein referred to as an IPTV system). Advertisements are inserted by the IPTV system into SMS messages, video and HTML data the IPTV system by advertising server 138. The service VHO communicates with the subscriber household 113 via the IPTV system servers and collects the subscriber data comprising the impression quality factors data from the household, the access node, aggregation network, service network and service applications.

In another particular illustrative embodiment access node control protocol (ANCP) is used to communicate between the service CO or 10 in the communication network and an access node 109. In another particular illustrative embodiment access node 109 is a DSLAM. In another illustrative embodiment, the aggregation network or central office 109 communicates with the SHO and VHO. In another particular illustrative embodiment, the CO communicates with the service application or IPTV system over an IPTV system communication path.

In another particular illustrative embodiment, the VHO receives impression quality factors data, including but not limited to device state data indicative of a degree of active advertising data viewing, device type data indicative of a type of advertising device, receiving the advertising data, and subscriber type data indicative of a type of subscriber viewing the advertising data. The impression quality factors data further includes but is not limited to channel viewer ship data including but not limited to multicast join data indicating what IPTV program a subscriber is watching, subscriber device state data and subscriber activity data collected from the access node. The VHO receives the impression quality factors data, advertising data forwarding data, advertising data discussion data, penetration data and sends the data to the data base 125. The data base 125 collects impression quality factors data, including but not limited to advertising data forwarding and advertising data discussion, applies weights and curves 130, correlates the weighted and accumulated impression quality factors categories data 128 with advertising quality criteria data to generate the qualified impression quality count 136. HCUs are compensated based on their contribution to penetration of the advertising data.

As shown in FIG. 1 impression quality factors data and impression quality factors categories data 128, impression quality factor categories weights, subscriber activity data profiles and curves 130 and penetration data 129 are stored at the VHO data base. The impression quality factors categories data and subscriber activity data are correlated 132 at the CO level and above. A number of customers viewing the commercial or advertising data vary at each time in a time interval.

Figure 7:
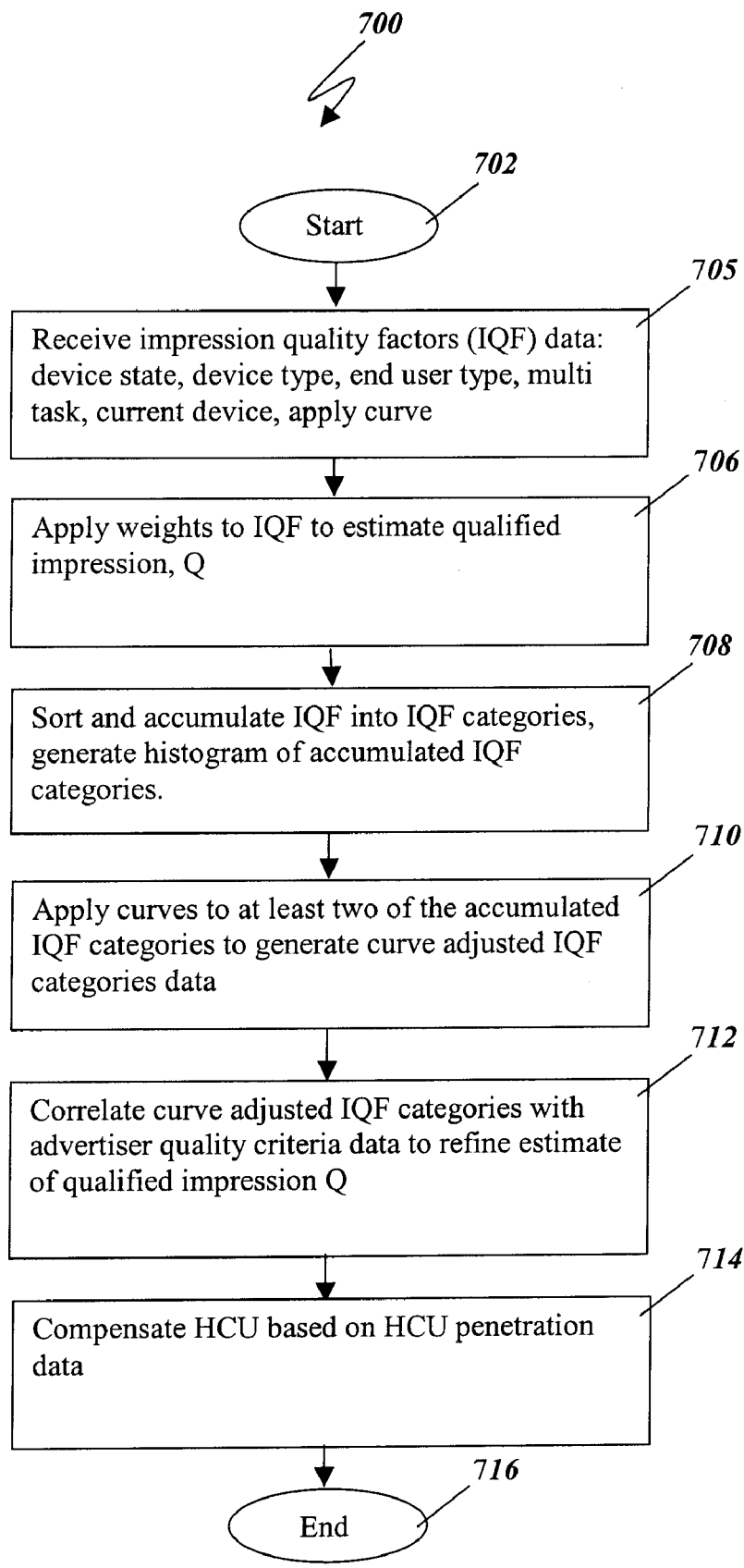
FIG. 7 depicts a flow chart for functions performed in another illustrative embodiment for delivering advertising data monitoring data sent and received by various subscriber devices associated with subscribers in a communication system, such as an IPTV system.

Turning now to FIG. 7 a flowchart 700 is illustrated for another particular embodiment in which functions are performed. As shown in block 702 in another particular illustrative embodiment a function starts and proceeds to block 704, where a server receives impression quality factors data from subscriber devices comprising subscriber device state, device type, subscriber type, multiple device usage, current device state, and application curve. In another particular illustrative embodiment at block 706, the impression quality factors data are sorted into impression quality factors categories data and weights are applied to the impression quality factors category data to estimate qualified impression quality, Q. At block 708, another embodiment accumulates weighted impression quality factors, and generates a histogram of the accumulated impression quality factor categories data. The impression quality factors are applied to the transactions between end users including but not limited to advertising data discussion and advertising data forwarding.

In another particular illustrative embodiment, an advertiser assigns weights from 1-10 to impression quality factor data categories. Thus when advertising data is discussed or forwarded to a user, impression quality factors data are calculated for the recipient of the advertising data forwarded or discussion data pertaining to the advertising data. The impression quality factor data categories include but are not limited to impressions for particular subscriber device types for particular subscriber types in particular advertising categories. Advertising categories are assigned by the IPTV system. The advertising categories in another particular embodiment include but are not limited to luxury cars, travel, health, education and entertainment. For example, impressions are qualified for a forwarded or discussed advertising data for a particular advertising category, luxury cars for a particular subscriber type, women. In this example, a particular luxury car slanted toward women are assigned weights as follows: For advertisements forwarded or discussed and viewed on television, a weight of 10 is assigned for women age 35-55, a weight of 7 for women age 18-35, a weight of 8 for men 35-55, a weight of 5 for men 18-35. For advertisements viewed on mobile telephones, a weight of 8 for women age 35-55, a weight of 5 for women age 18-35, a weight of 6 for men age 35-55, a weight of 4 for men age 18-35. For online commercials forwarded or discussed and viewed a weight of 6 for women age 35-55, a weight of 3 for women age 18-35, a weight of 4 for men age 35-55, a weight of 2 for men age 18-35.

Geographic weights are also assigned by advertisers based on desired geographic coverage for a ZOI and penetration desired for particular advertising data. A histogram of viewers sorted by impression quality factor categories is generated showing how many viewers in each impression quality factor category viewed a particular advertisement. Different weights are assigned for advertising data forwarded and advertising data discussed, depending on the advertiser's set parameters for calculating advertising data penetration. In a particular embodiment, a weight of 5 out of 10 is assigned for forwarding advertising data, a weight of 7 assigned for replaying the forwarded advertising data and a weight of 3 assigned for discussing the advertising data.

An additional weight point can be assigned (i.e., given a weight of 9 instead of 8) to subscribers who receive and view forwarded advertising data on a subscriber device that is received and viewed on their preferred subscriber device as indicated by a subscriber device preference. A subscriber device preference is indicated by a subscriber profile showing that prior reception of advertisements on a particular subscriber device type are viewed and not skipped. For example, if a subscriber receives an advertisement on a television for a particular product but only views 10 seconds of a 30 second advertisement, but views the entire advertisement of the same advertisement on a mobile phone, then the subscriber's preferred subscriber device is a mobile phone and advertisements viewed on the mobile phone are given extra weight. In this case the subscriber device preference is the mobile phone. In another particular embodiment, a subscriber device preference is indicated by a subscriber selection at registration with a communication network.

Values can also be assigned for duration or how much of an advertisement a particular subscriber watched. If a subscriber only saw the first 10 seconds of a 30 second advertisement, the advertisement viewing receives a only one sixth of its assigned weight and may be deemed as inappropriate for the demographic and device type for that particular viewer type, for example, males 18-35 on a mobile phone. If the same advertisement is watched for the last 20 seconds of the advertisement, the advertisement viewing receives three fourths of its assigned weight and deemed appropriate for the demographic and device type for that particular viewer type, for example, males 18-35 on a mobile phone. The weighted impression quality factors are adjusted for duration and accumulated for additional processing.

At block 710 a particular illustrative embodiment applies curves to at least two of the accumulated compression quality factor categories data to generate curve-adjusted impression quality factors categories data. In a particular embodiment, different curves are applied to different impression quality factor categories data to generate curve-adjusted impression quality factor categories data. For example, continuing with the luxury car example from above, different curves are applied to different accumulated impression quality factors categories data. An S curve in applied data for men ages 18-35 and 35-55, a linear curve to data for women age 35-55 and an exponential curve to data for women age 35-55. In another particular illustrative embodiment, at block 712 a particular illustrative embodiment correlates the curve-adjusted impression quality factor categories data with a set of advertising advertiser quality criteria data to refine the estimate of the qualified impression, Q. The advertiser quality criteria data may favor or weight particular groups in particular advertising categories at particular times and contexts.

The curve adjusted impression quality factors categories generated in block 710, are compared to advertiser quality criteria data as follows. An advertiser provides impression quality criteria data for rating impression quality, Q by device type and subscriber type. In a particular illustrative embodiment, impression quality criteria data give a value of 10 points each to every television impression viewed by a woman age 35-55 with an income over $100,000, 9 points for man age 35-55 with an income over $100,000 and 8 points for woman age 35-55 with an income $50,000-$99,000. At block 714 a particular embodiment compensates each HCUs based on advertising data penetration for each HCU. In a particular illustrative embodiment, the flow of function execution ends at block 716.

Figure 8:
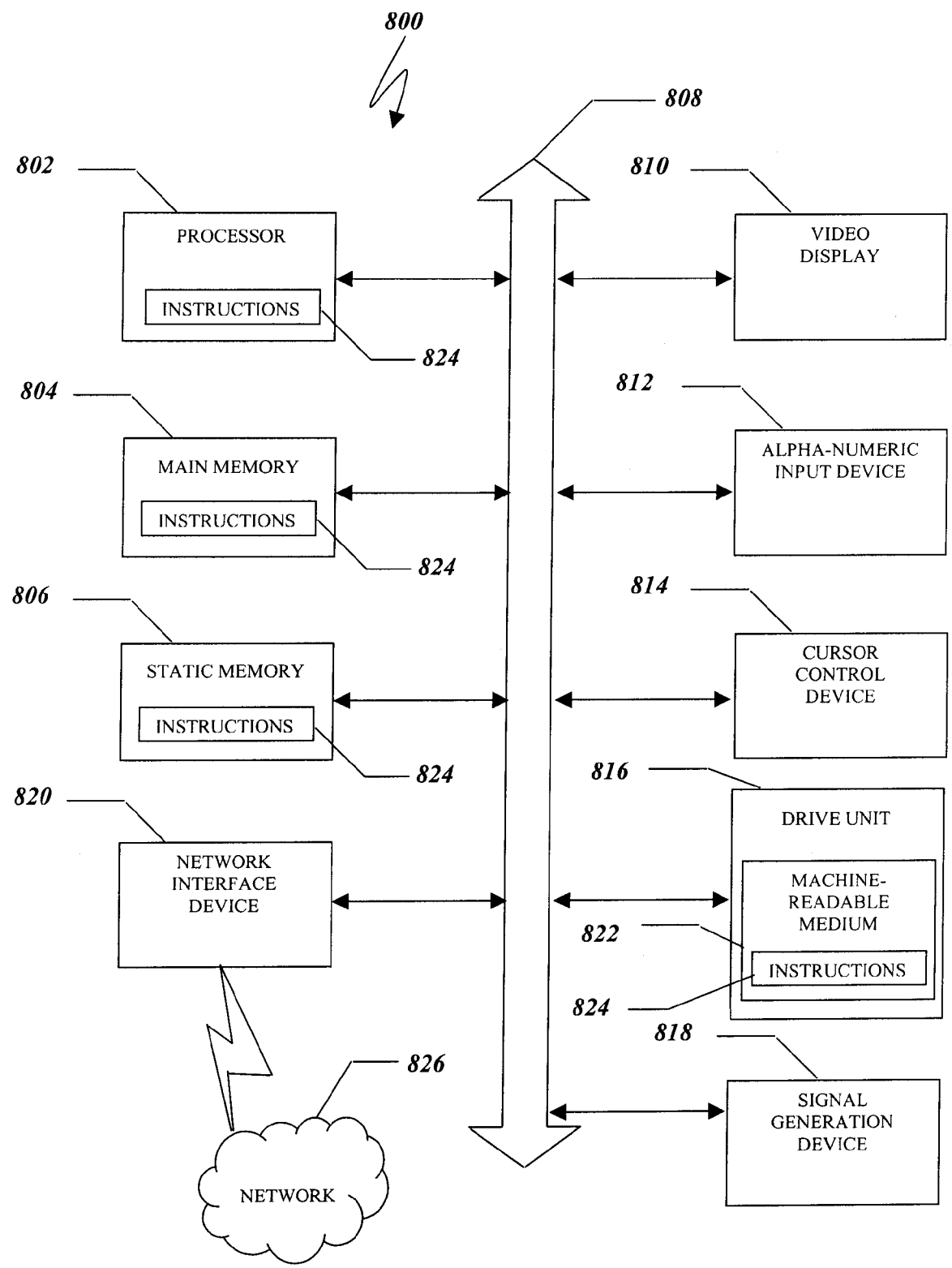
FIG. 8 depicts an illustrative embodiment of a machine for performing functions disclosed in an illustrative embodiment.

FIG. 8 is a diagrammatic representation of a machine in the form of a computer system 800 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., liquid crystals display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface.

The disk drive unit 816 may include a machine-readable medium 822 on which is stored one or more sets of instructions (e.g., software 824) embodying any one or more of the methodologies or functions described herein, including those methods illustrated in herein above. The instructions 824 may also reside, completely or at least partially, within the main memory 804, the static memory 806, and/or within the processor 802 during execution thereof by the computer system 800. The main memory 804 and the processor 802 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820. The machine readable medium may also contain a data structure for containing data useful in providing a functional relationship between the data and a machine or computer in an illustrative embodiment of the disclosed system and method.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable medium, containing instructions executable by a processor are to
measure user-to-user connectivity between end user devices within a community of end user devices, wherein the user-to-user connectivity is measured by a number, frequency, duration and data volume of interactions between end user devices in the community of end user devices wherein the interactions comprise comprising advertising data forwarding and advertising data discussion indicated by deep packet inspection and detection of textual, aural and imagery key words in advertising data and messages sent between end user devices within the community of end user device;
determine a plurality of highly connected users within the community of end user devices based on the user-to-user connectivity, wherein each of the plurality of highly connected users has greater user-to-user connectivity within the community of end user devices than other end user devices within the community of end user device; and
send advertising data to selected highly connected users based on a zone of influence for each of the plurality of highly connected users.

2. The medium of claim 1, wherein the zone of influence for each highly connected user is based a number of the interactions with end user devices outside of the community of end user devices by the HCU highly connected user.

3. The medium of claim 2, the instructions further comprising, instructions to:
weight each highly connected user based on a zone of influence number of contacts, affiliation type and geographic distribution of the contacts.

4. The medium of claim 3, wherein the advertising data is selected based on a correlation between advertising characterization data and the highly connected user weights.

5. The medium of claim 1, the instructions further comprising, instructions to:
measure forwarding of the advertising data from each highly connected user to end user devices within the zone of influence.

6. The medium of claim 5, the instructions further comprising, instructions to:
measure discussion of the advertising data between end user devices in the zone of influence.

7. The medium of claim 6, the instructions further comprising, instructions to:
instructions to calculate penetration of the advertising data based on the advertising data forwarding and advertising data discussion between each highly connected user and end user devices within the zone of influence, wherein textual and aural key words and imagery found in the advertising data forwarded and discussed between the highly connected user and the end user devices within the zone of influence are inspected by the DPI devices and image recognition functions and used to calculate penetration of the advertising data.

8. The medium of claim 7, wherein the instructions to calculate the penetration of the advertising data further comprises instructions to the penetration data based on the weights of the highly connected users.

9. The medium of claim 8, wherein the instructions to calculate the penetration further comprises instructions to calculate the penetration based on advertising data forwarding and advertising data discussion between the zone of influence and end user devices outside of the zone of influence.

10. The medium of claim 9, the instructions further comprising, instructions to:
instructions to determine compensation for each highly connected user based on the calculated penetration of advertising data for each highly connected user.

11. A system for sending advertising data the system comprising:
a processor in data communication with a non-transitory computer readable medium; and
a computer program embedded in the computer readable medium, the computer program further comprising instructions to:
measure user-to-user connectivity between users within a community of users,
wherein the user-to-user connectivity is measured by a number, frequency,
duration and data volume of interactions between end user devices in the community of end user devices wherein the interactions comprise advertising data forwarding and advertising data discussion indicated by deep packet inspection and detection of textual, aural and imagery key words in advertising data and messages sent between end user devices within the community of end user device; and
and instructions to send advertising data to selected highly connected users based on a zone of influence for each highly connected user.

12. The system of claim 11, the medium further comprising instructions to
determine a plurality of highly connected users within the community of end user devices based on the user-to-user connectivity, wherein each of the plurality of highly connected users has greater user-to-connectivity within the community of end user devices than other end user devices within the community of end user device, wherein the zone of influence for each of highly connected user is based a number of interactions with end user devices outside of the community of end user devices by the highly connected user.

13. The system of claim 12, further comprising
instructions to assign weights to each highly connected user based on a zone of influence number of contacts, affiliation type and geographic distribution of the contacts.

14. The system of claim 13, wherein the advertising data is selected based on a correlation between advertising characterization data and the highly connected user weights.

15. The system of claim 11, the computer program further comprising
instructions to measure forwarding of the advertising data from each highly connected user to end user devices within the zone of influence.

16. The system of claim 15, the computer program further comprising
instructions to measure discussion of the advertising data within each zone of influence.

17. The system of claim 15, the computer program further comprising
    instructions to calculate penetration of the advertising data based on the advertising data forwarding and advertising data discussion between the end user devices in the community of end user devices and end user devices within the zone of influence, wherein textual and aural key words and imagery found in the advertising data forwarded and discussed between the highly connected user and the end user devices within the zone of influence are inspected by the DPI devices and image recognition functions and used to calculate penetration of the advertising data.

18. The system of claim 17, wherein the instructions to calculate the penetration of the advertising data further comprise instructions to weight the penetration data based on weights of the highly connected users.

19. The system of claim 18, wherein the instructions to calculate the penetration further comprise instructions to calculate penetration based on advertising data forwarding and advertising data discussion between the zone of influence and end user devices outside of the zone of influence.

20. The system of claim 19, further comprising instructions to
    determine compensation for each highly connected user based on the calculated penetration of advertising data for each highly connected user.

21. A non-transitory computer readable medium, containing a data structure for containing data useful by a processor in performing functions to send advertising data the data structure comprising:

a first field for containing data indicative of members of a community of end user devices in a data communication system used by the processor for monitoring transactions between the members of the community of end user devices; and a second field for containing data indicative of a plurality of highly connected user devices in the community, wherein the processor determines highly connected users that are end user devices that have a user-to-user connectivity greater than other end user devices in the community of end user devices, wherein the user-to-user connectivity is measured by a number, frequency, duration and data volume of interactions comprising advertising data forwarding and advertising data discussion indicated by deep packet inspection and detection of textual, aural and imagery key words in advertising data and messages sent between end user devices within the community of end user device.

22. The medium of claim 21, the data structure further comprising a third field for containing data indicative of a zone of influence for each of the highly connected users.

23. The medium of claim 22, the data structure further comprising a fourth field for containing data indicative to characterization data for each zone of influence.

24. The medium of claim 23, the data structure further comprising a fifth field for containing data indicative of advertising penetration data based on advertising forwarding data and advertising discussion data.

* * * * *